United States Patent
McNeil et al.

(12)

(10) Patent No.: US 6,568,764 B2
(45) Date of Patent: May 27, 2003

(54) DUAL WHEEL ASSEMBLY

(75) Inventors: James McNeil, Crestmead (AU);
Stuart McNeil, Crestmead (AU);
Clinton John Harding, Crestmead (AU)

(73) Assignee: James McNeil and Ruby McNeil, Crestmead (AU)

( * ) Notice: Subject to any disclaimer, the term of this patent is extended or adjusted under 35 U.S.C. 154(b) by 0 days.

(21) Appl. No.: 09/959,872

(22) PCT Filed: Jan. 18, 2001

(86) PCT No.: PCT/AU01/00047
§ 371 (c)(1),
(2), (4) Date: Nov. 9, 2001

(87) PCT Pub. No.: WO02/057095
PCT Pub. Date: Jul. 25, 2002

(65) Prior Publication Data
US 2002/0149256 A1 Oct. 17, 2002

(51) Int. Cl.⁷ .......................... B60B 25/04; B60B 11/00
(52) U.S. Cl. .................... 301/36.1; 301/13.2; 301/40.2; 152/410
(58) Field of Search ................ 301/36.1, 13.1, 301/13.2, 38.1, 39.1, 40.1, 40.2, 40.3, 41.1, 95.101; 152/409, 410

(56) References Cited

U.S. PATENT DOCUMENTS

| | | | | |
|---|---|---|---|---|
| 2,614,603 A | * | 10/1952 | Howley | 152/409 |
| 2,807,507 A | * | 9/1957 | Cook | 301/36.1 |
| 3,328,088 A | * | 6/1967 | Olson | 301/36.1 |
| 3,779,301 A | | 12/1973 | Lejeune | |
| 3,783,927 A | | 1/1974 | Verdier | |
| 4,003,421 A | * | 1/1977 | Lejeune | 152/409 |
| 4,373,567 A | | 2/1983 | Declercq | |
| 4,706,723 A | * | 11/1987 | Loeber et al. | 152/410 |
| 4,818,031 A | * | 4/1989 | Brown | 301/36.1 |
| 5,232,034 A | | 8/1993 | Gergele | |
| 5,240,055 A | | 8/1993 | Smith | |

FOREIGN PATENT DOCUMENTS

| | | |
|---|---|---|
| AU | 75657/74 | 5/1976 |
| SU | 1830209 | 8/1995 |
| SU | 1830208 | 10/1995 |
| WO | WO 90/05645 | 5/1990 |

* cited by examiner

Primary Examiner—Russell D. Stormer
(74) Attorney, Agent, or Firm—Nixon & Vanderhye, P.C.

(57) ABSTRACT

A dual wheel assembly is formed by an inner wheel (10) and an outer wheel (30) coaxially mounted on a common hub (11). The inner wheel (10) has an inner tire (13) mounted on an inner wheel rim (12). The outer wheel (30) has an outer tire (13A) mounted on an outer wheel rim (32). The wheels (13, 13A) are of the same size, but the diameter of the outer wheel rim (32) is smaller than the inner wheel rim (12), to permit the inner tire (13) to pass over the outer wheel rim (32), thereby enabling the inner tire (13) to be removed without first removing the outer wheel rim (32). Removable bead seats (37, 40) are provided between the outer wheel rim (32) and its tire (13A). These bead seats are thicker than the corresponding bead seat(s) on the inner wheel (10) to compensate for the reduced diameter of the outer wheel rim.

9 Claims, 8 Drawing Sheets

DUAL WHEEL ASSEMBLY

This invention relates to an improved dual wheel assembly. In particular, the invention is directed to an improved dual wheel assembly for heavy transport vehicles, which permits the inner tire of the dual wheel to be removed and re-fitted without removing the outer wheel rim.

BACKGROUND ART

Dual wheels are commonly used in heavy transport vehicles, such as mining and earthmoving vehicles, to provide greater load bearing capacity and traction. A typical dual wheel assembly comprises a pair of juxtaposed wheel rims mounted coaxially on a common hub, with each rim having a tire fitted thereon.

The wheel rims are of substantially identical size and design. The tires are of the same, size and may be fitted interchangeably to either rim. Each wheel rim has a fixed annular flange at one end thereof which extends radially outwardly from the wheel rim and provides an end stop for the tire. The wheel rims are normally mounted to the hub with reversed orientations. That is, the end flange on the inner wheel is located at the inner end of the wheel rim, while the end flange on the outer wheel is located at the outer end of the outer wheel rim.

Due to the design and mounting of the wheels, and in particular the end flange on the outer wheel rim, the outer wheel must be removed from the hub in order to change the outer tire. Moreover, the outer wheel must also be removed in order to change the inner tire. Removing the wheel requires a large number of wheel nuts to be removed. This is a tedious and time consuming process, resulting in lengthy and costly downtime for the heavy duty vehicles. Specialised lifting equipment is also required for handling the heavy wheel rims. When the wheel is refitted, the wheel nuts must be screwed to the proper torque to avoid damage to the mounting knaves on the wheel.

It is an object of this invention to provide an improved dual wheel assembly which overcomes, or at least ameliorates, one or both of the abovedescribed disadvantages.

SUMMARY OF THE INVENTION

In one form, the invention comprises a dual wheel assembly for a vehicle, including an inner wheel having an inner wheel rim and an inner tire mounted thereon, an outer wheel having an outer wheel rim and an outer tire mounted thereon, the inner and outer wheel rims being mounted coaxially on the vehicle, and the inner and the outer tires being substantially of the same size, characterised in that the outer wheel rim is of smaller diameter than the inner wheel rim such that the inner tire may pass around the outer wheel rim to enable it to be removed from the vehicle without removing the outer wheel rim.

Since it is not necessary to remove the outer wheel rim in order to enable the inner tire to be removed from the vehicle, the down time normally required for changing the inner tire is greatly reduced.

Each wheel has at least one removable annular bead seat located between the wheel rim and the respective tire, the bead seat(s) on the outer wheel having a greater radial thickness than the bead seats on the inner wheel to compensate for the reduced diameter of the outer wheel rim.

Preferably, the outer wheel has two removable bead seats located at respective opposite ends of the wheel rim. The inner removable bead seat abuts against a fixed annular flange on the wheel rim, either directly or indirectly. The outer removable bead seat is retained on the wheel rim in use by a locking ring on the outside thereof.

In another form, the invention can be broadly described as a wheel assembly comprising a wheel rim, a pair of removable annular bead seats mounted on the wheel rim, each bead seat being adapted to provide a seat for a respective bead of a tire, characterised in that the wheel rim is of smaller diameter than a standard wheel rim for the tire and the bead seats are radially thicker than a standard bead seat, to thereby permit the tire to be fitted to the wheel rim.

In yet another form, the invention can be broadly described as a multiple wheel assembly comprising a first wheel having a first wheel rim and a first tire fitted thereon, a second wheel having a second wheel rim and a second tire fitted thereon, the first and second wheel rims being mounted coaxially on a hub, the first and second tires being of the same size and having inner and outer beads with predetermined inside diameters, characterised in that the second wheel rim has a maximum outer diameter less than the inside bead diameter of the first wheel.

In order that the invention may be more fully understood and put into practice, but without limiting the scope of the invention, a preferred embodiment thereof will now be described with reference to the accompanying drawings.

DESCRIPTION OF PREFERRED EMBODIMENT

Figure 1:
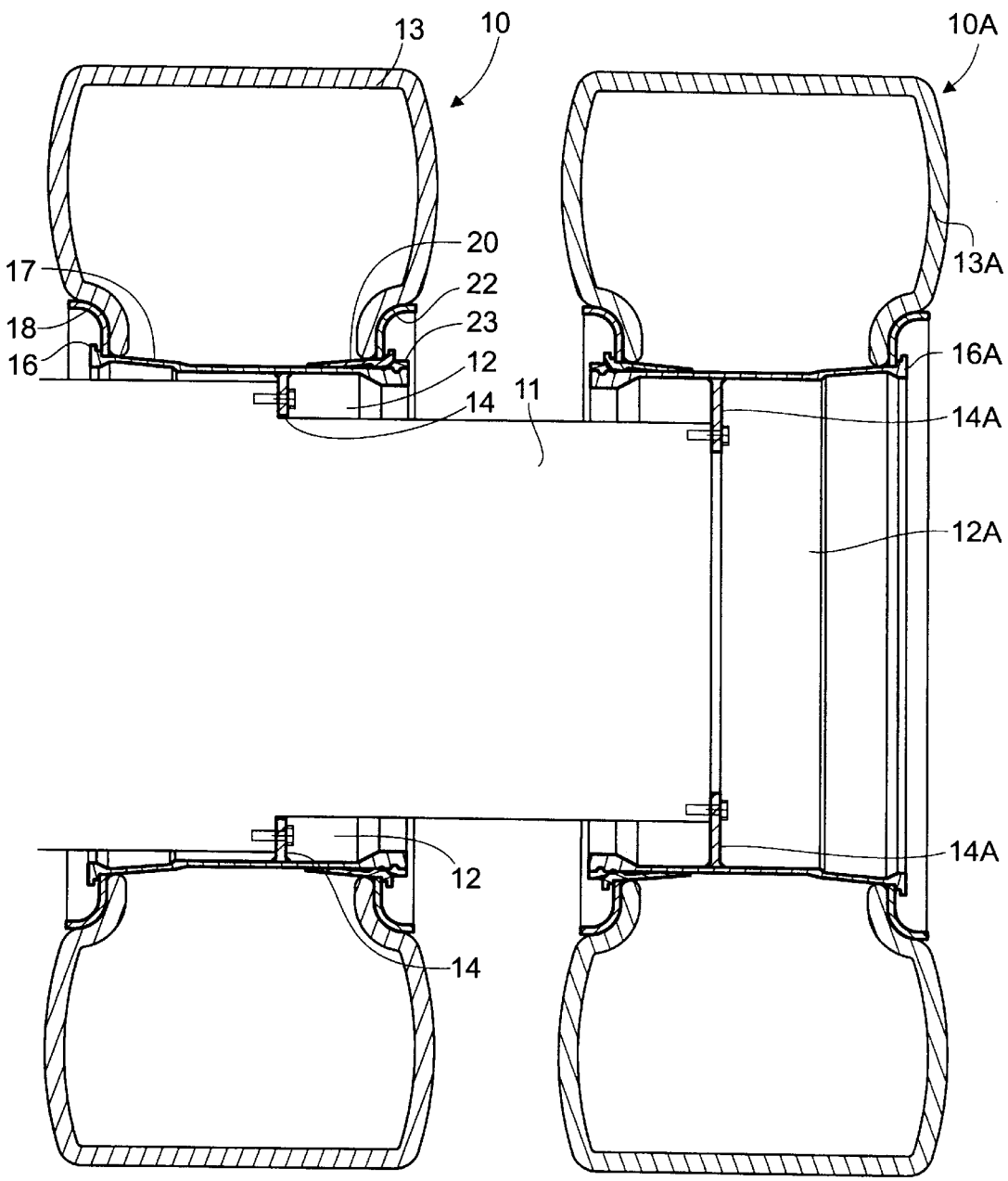
FIG. 1 is a schematic sectional elevation of a prior art dual wheel assembly.

As shown in FIG. 1, a conventional dual wheel assembly for a heavy transport vehicle comprises a pair of wheels 10, 10A mounted side-byside on a common axle hub 11. The inner wheel 10 has a generally cylindrical wheel rim 12 on which a tire 13 is mounted. The wheel rim has a knave 14 fixed to the inside thereof having a series of bolt holes spaced circumferentially around an annular flange. The knave 14 is used to mount the wheel rim 12 to a shoulder of the hub 11.

Figure 2:
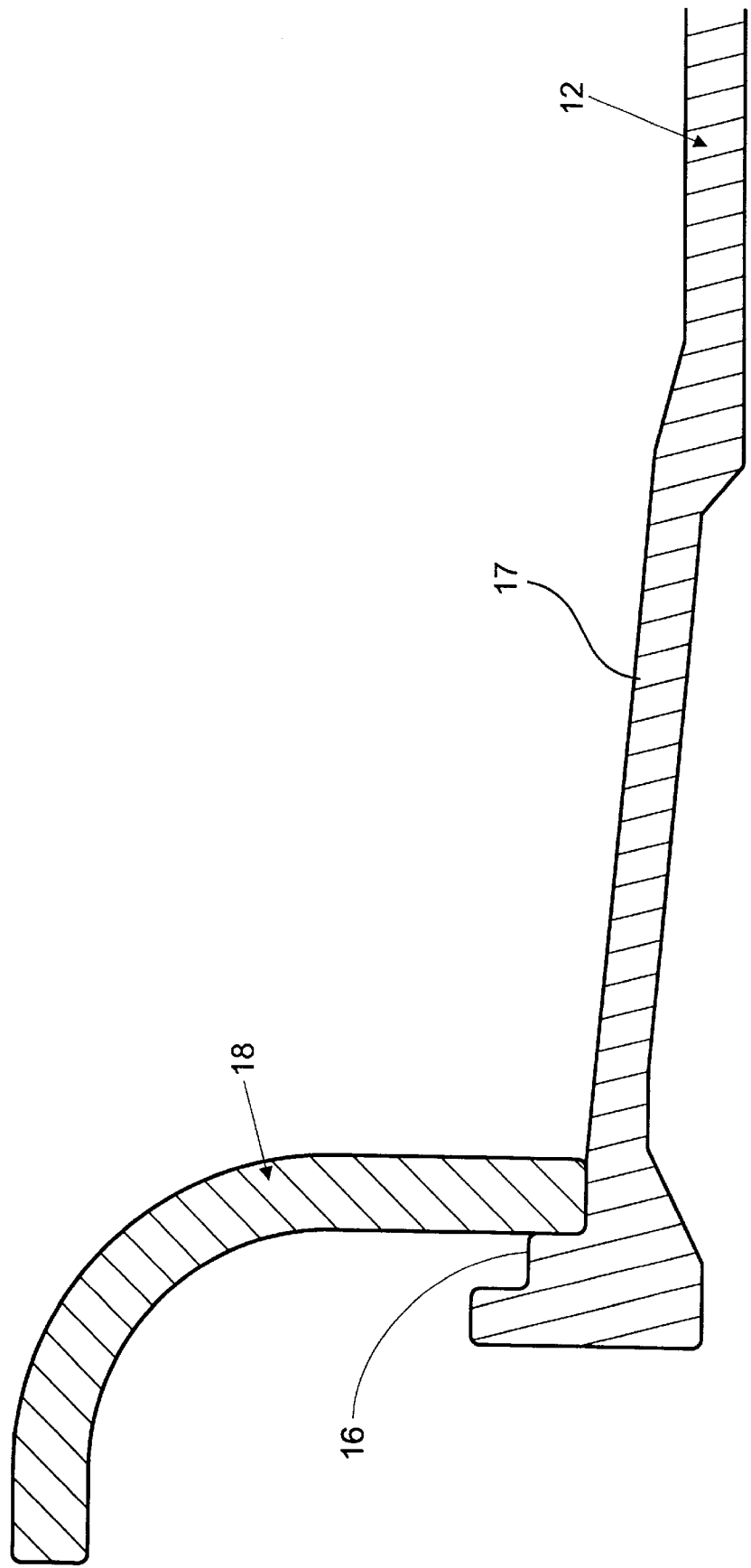
FIG. 2 is an enlarged sectional elevation of the fixed bead seat portion of the inner wheel of FIG. 1.

As shown more clearly in FIG. 2, the wheel rim 12 has an annular flange 16 at one end thereof which extends radially outwardly. The portion of the wheel rim 12 adjacent the end flange 16 is tapered outwardly towards the end flange to form a fixed bead seat 17 for one bead of the tire 13. When the tire 13 is fitted to the rim 12, the bead abuts against the flange 16. It is common practice to place an annular flange 18 between the end flange 16 and the tire 13 to retain and support the inner side wall of the tire 13, in which case the tire still abuts against the flange 16 but indirectly via the tire flange 18.

Figure 3:
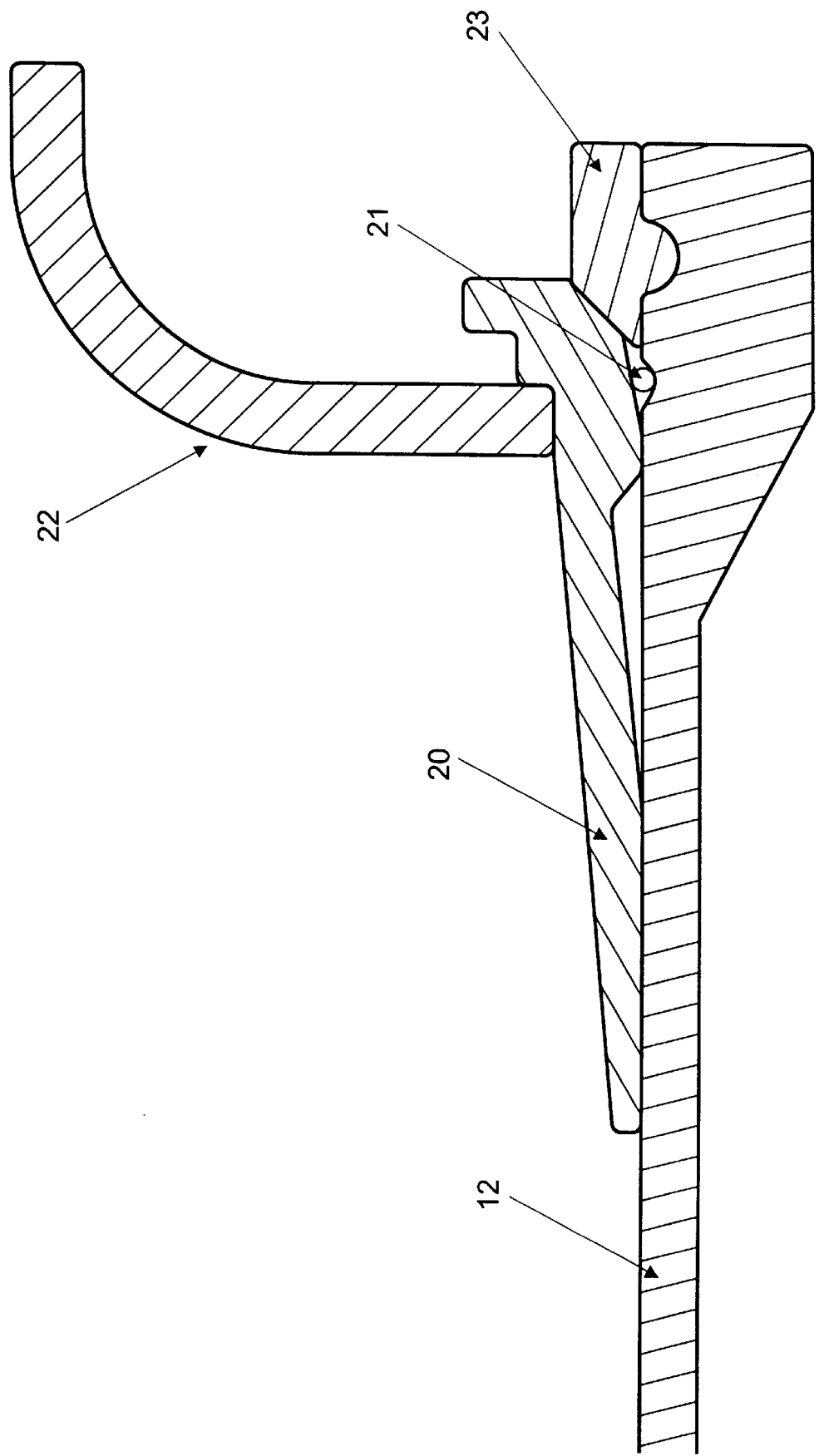
FIG. 3 is an enlarged sectional elevation of the removable bead seat portion of the inner wheel of FIG. 1.

As shown more clearly in FIG. 3, a removable bead seat 20 is mounted to the other end of the wheel rim 12. The removable bead seat 20 is a generally cylindrical or ring-like member of tapered thickness which provides a seat for the other bead of the tire 13. An O-ring 21 is located in an annular groove on the wheel rim 12 to seal between the bead seat 20 and the rim 12. Again, a tire flange 22 is mounted on the bead seat 20 to retain and support the inner side wall of the tire 13.

The removable bead seat is retained in position, in use, by a split locking ring 23 which has an inner bead which locates in an annular groove around the rim 12. Lock ring retainers are commonly used to keep the lock ring in place. The abovedescribed design and construction of the wheel assembly is known in the art, and need not be further described in detail.

The outer wheel 10A is of substantially the same design as the inner wheel 10, except that the mounting holes on its knave 14A are circumferentially arranged in a smaller diameter circle for mounting to the (smaller) outer end of the hub 11. The tires 13, 13A are of the same, standard size and may be fitted interchangeably to either wheel rim 12, 12A. The wheel 10A is normally mounted in reverse orientation to wheel 10. That is, the end flange 16 of wheel 10 is on the inside of the wheel rim, while the end flange 16A of the outer wheel 10A is on the outside of the wheel rim.

Figure 4:
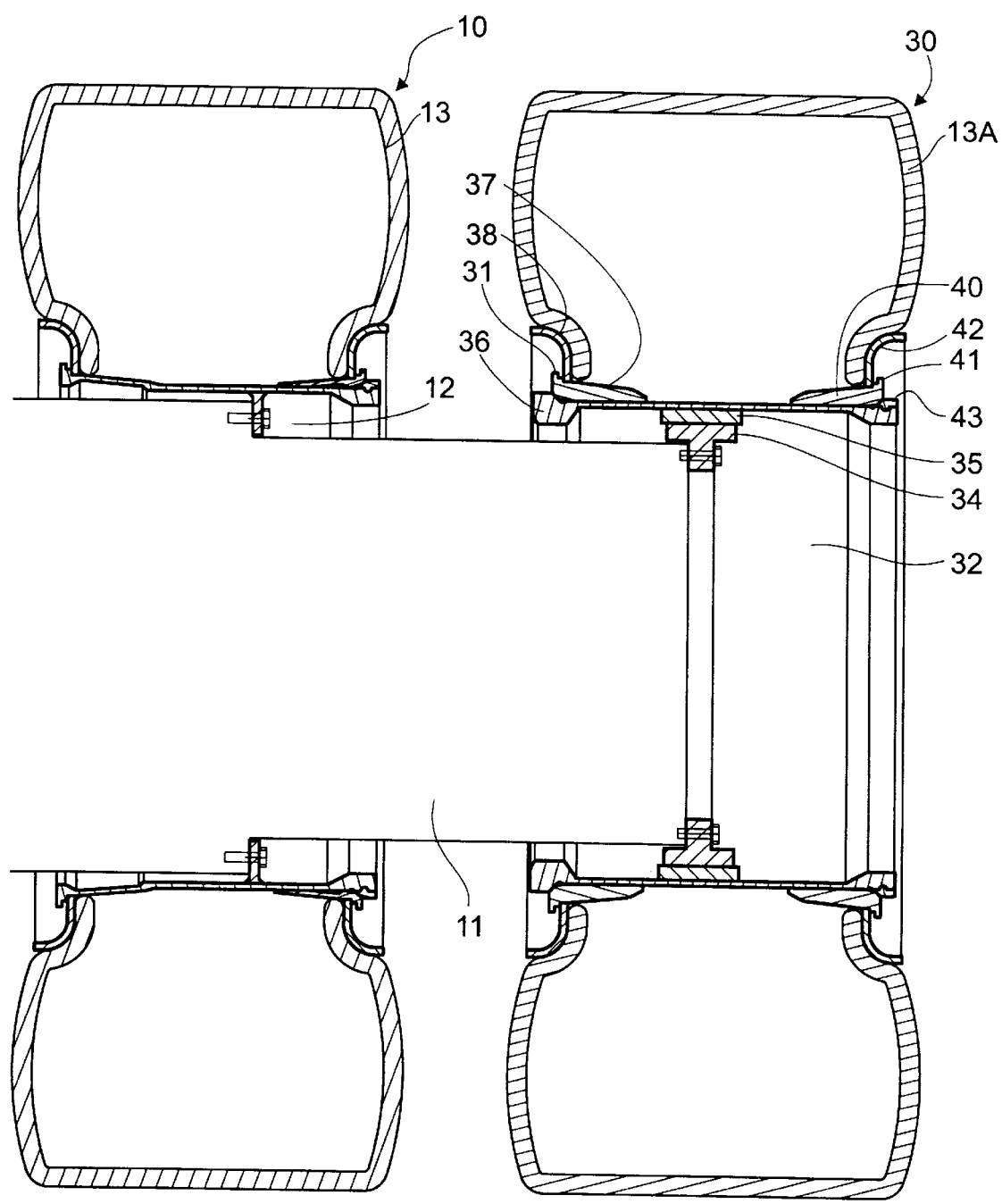
FIG. 4 is a schematic sectional elevation of a dual wheel assembly according to one embodiment of the invention.

FIG. 4 illustrates an improved dual wheel assembly according to one embodiment of this invention. The inner wheel 10 of this assembly is a conventional wheel as shown in FIG. 1, and the same reference numerals will be used to designate the components of that wheel. The outer wheel 30 has the same tire 13A as the inner wheel, but a different wheel rim 32. The principal difference is that the diameter of the wheel rim 32 of the outer wheel 30 is smaller than the diameter of the wheel rim 12 of the inner wheel 10. The purpose and advantages of the reduced diameter rim will be described below.

Figure 7:
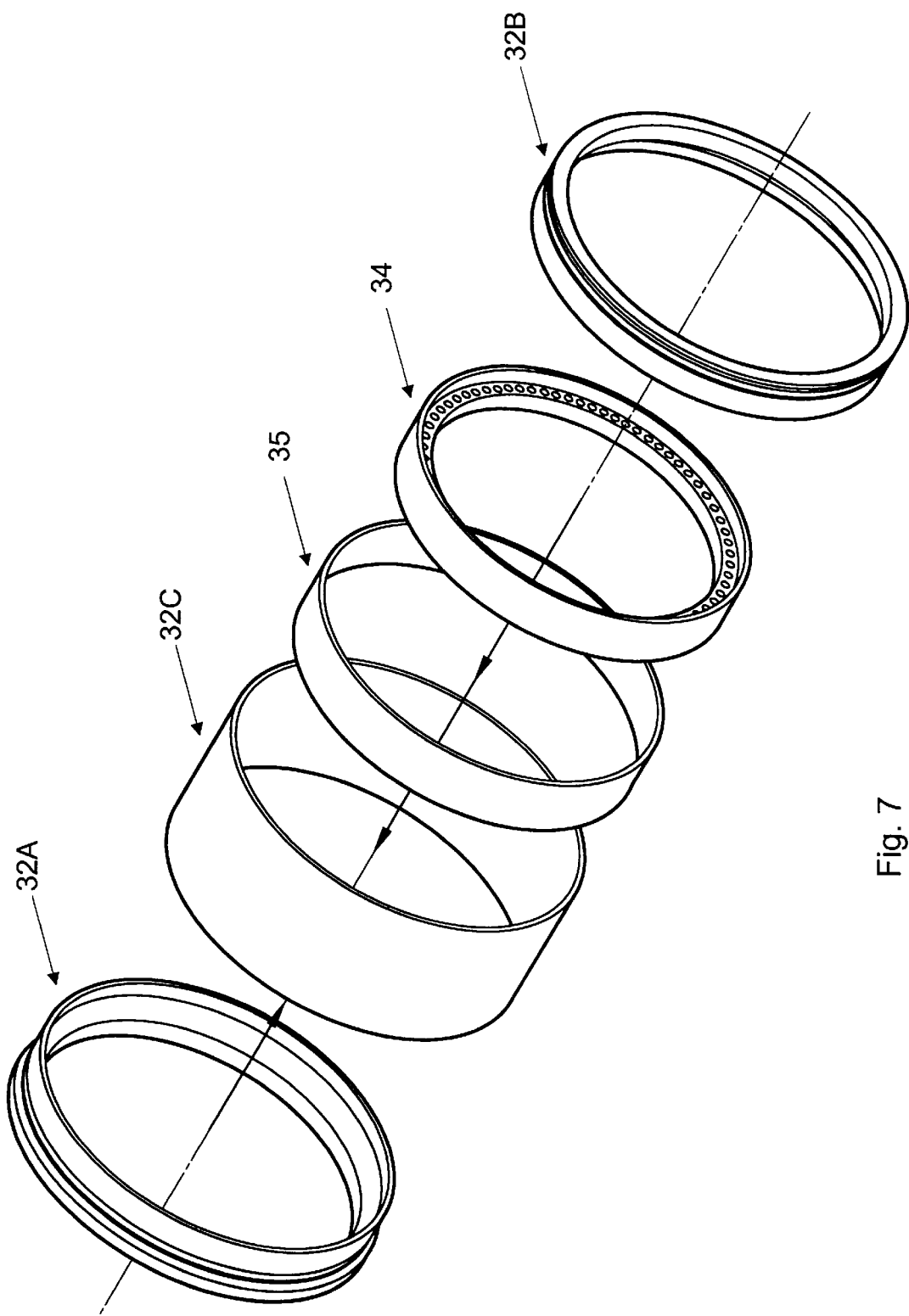
FIG. 7 is an exploded view of the wheel rim of the outer wheel of the assembly of FIG. 4.

As with a conventional wheel rim, the wheel rim 30 is generally of cylindrical shape. As shown in FIG. 7, the wheel rim 32 is typically formed by welding a machined rear end piece 32A and a machined front end piece 32B to opposite ends of a tubular centre section 32C. Flanges and grooves are machined or otherwise formed in the front and rear end pieces for the purposes described below. A knave 34 is fitted to the inside of the rim 32, for mounting the wheel to the end of the hub 11. A spacer 35 of the desired thickness may be welded between the knave 34 and the centre section 32C of the rim 32. It will be appreciated by those skilled in the art that the reduced diameter wheel 30 of this invention can be mounted to the hub 11 in place of the conventional wheel 10A of FIG. 1, without any modification required to the hub.

Figure 5:
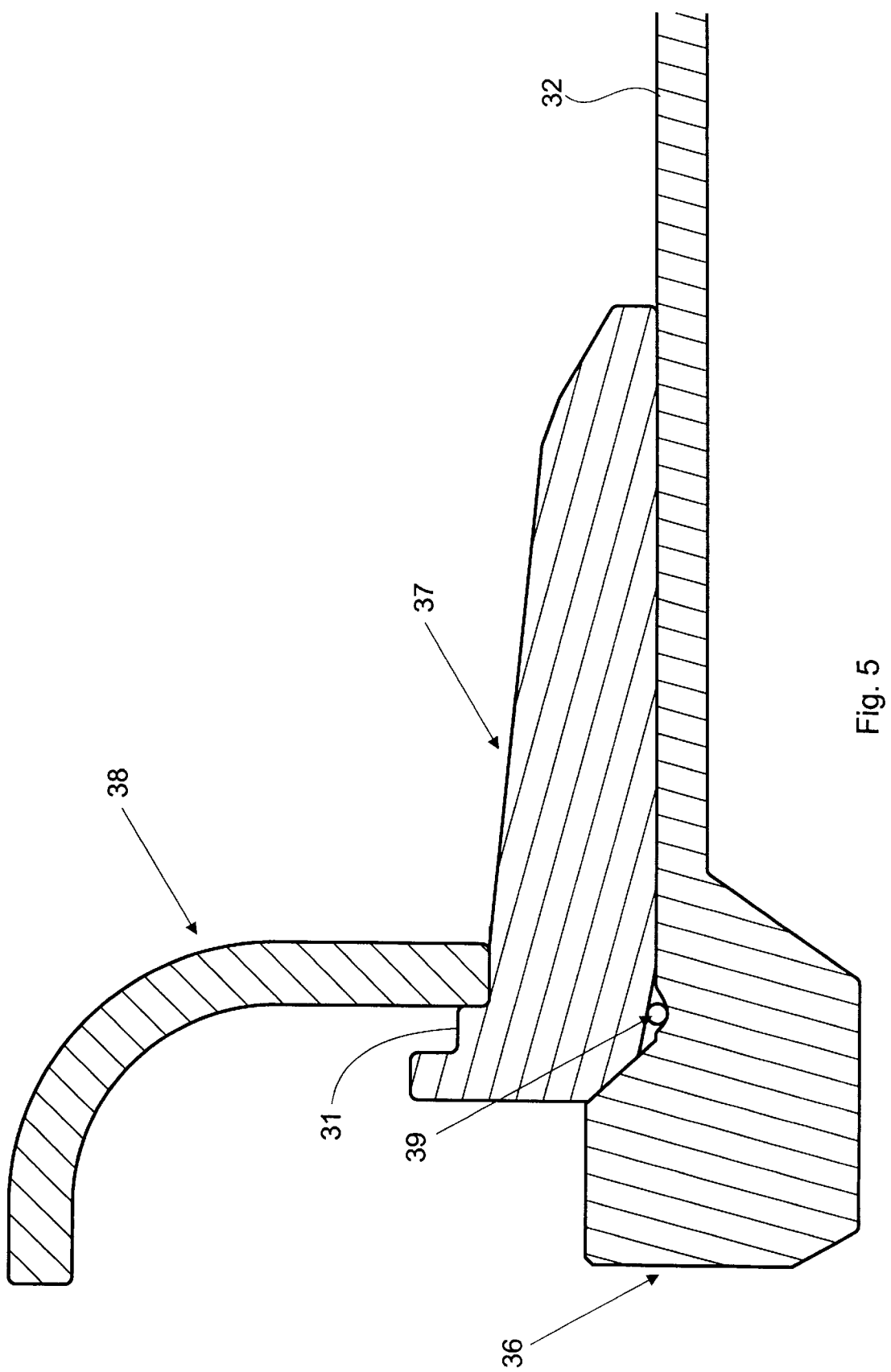
FIG. 5 is an enlarged sectional elevation of the inner bead seat portion of the outer wheel of FIG. 1.

As shown more clearly in FIG. 5, the inner end of wheel rim 32 is provided with an annular end flange 36 which protrudes radially outwardly from the rim, but to a smaller extent than the end flange 16 on the conventional wheel rim 12. The main purpose of the end flange 36 is to provide an abutment for a removable annular bead seat 37.

The bead seat 37 provides a seat for the inner bead of a standard size tire. Since the wheel rim 32 has a smaller diameter than the conventional wheel rim 12, but uses the same size tire, the removable bead seat 37 is radially thicker than the removable bead seat 20 of the conventional wheel. That is, the thickness of the removable bead seat on the wheel rim 32 is increased to compensate for the reduced diameter of the wheel rim.

The bead seat 37 includes an end flange 31 which provides a stop for one bead of the tire 13A. A conventional tire flange 38 is normally mounted on the bead seat 37 to retain and support the inner side wall of the tire 13A. An O-ring 39 is located in a groove in the wheel rim 32 to provide a seal between the removable bead seat 37 and the wheel rim.

Figure 6:
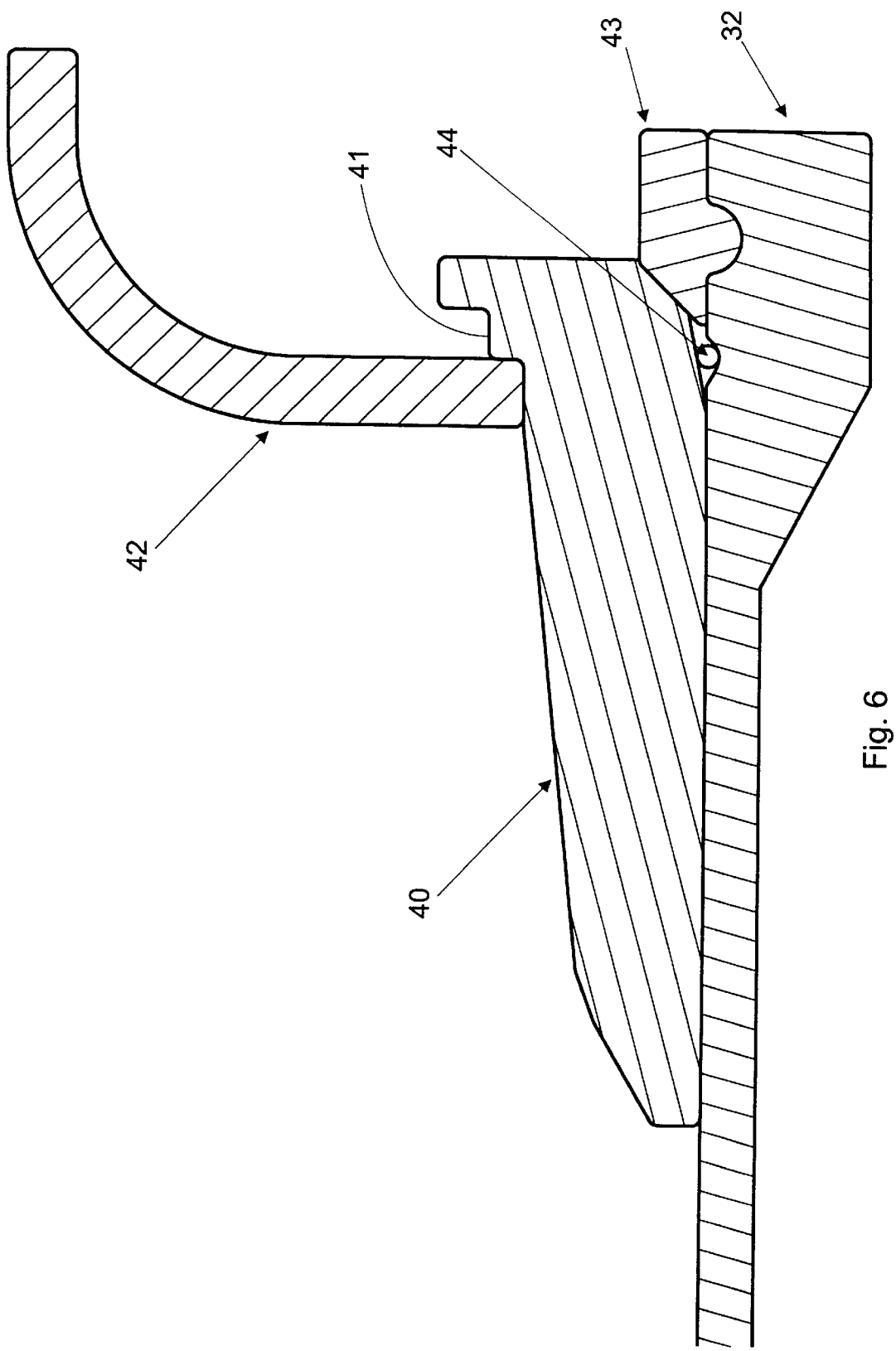
FIG. 6 is an enlarged sectional elevation of the outer bead seat portion of the outer wheel of FIG. 1.

As shown more clearly in FIG. 6, a removable bead seat 40 is also provided at the other end of the wheel rim 32 to provide a seat for the other bead of the tire. As with bead seat 37, the removable bead seat 40 is thicker than the conventional bead seat, to compensate for the reduced diameter of the wheel rim 32.

An end flange 41 is provided on the bead seat 40 to serve as a stop for the outer bead of the tire 13A, and a tire flange 42 is also mounted on the bead seat 40 to retain and support the inner side wall of the tire. An O-ring 44 is seated in a groove in the rim 32 under the removable bead seat 40, to provide a seal between the bead seat and the rim. A locking ring 43 is mounted to outer end of the wheel rim 32 in a conventional manner, to retain the removable bead seat 40 on the rim.

Figure 8:
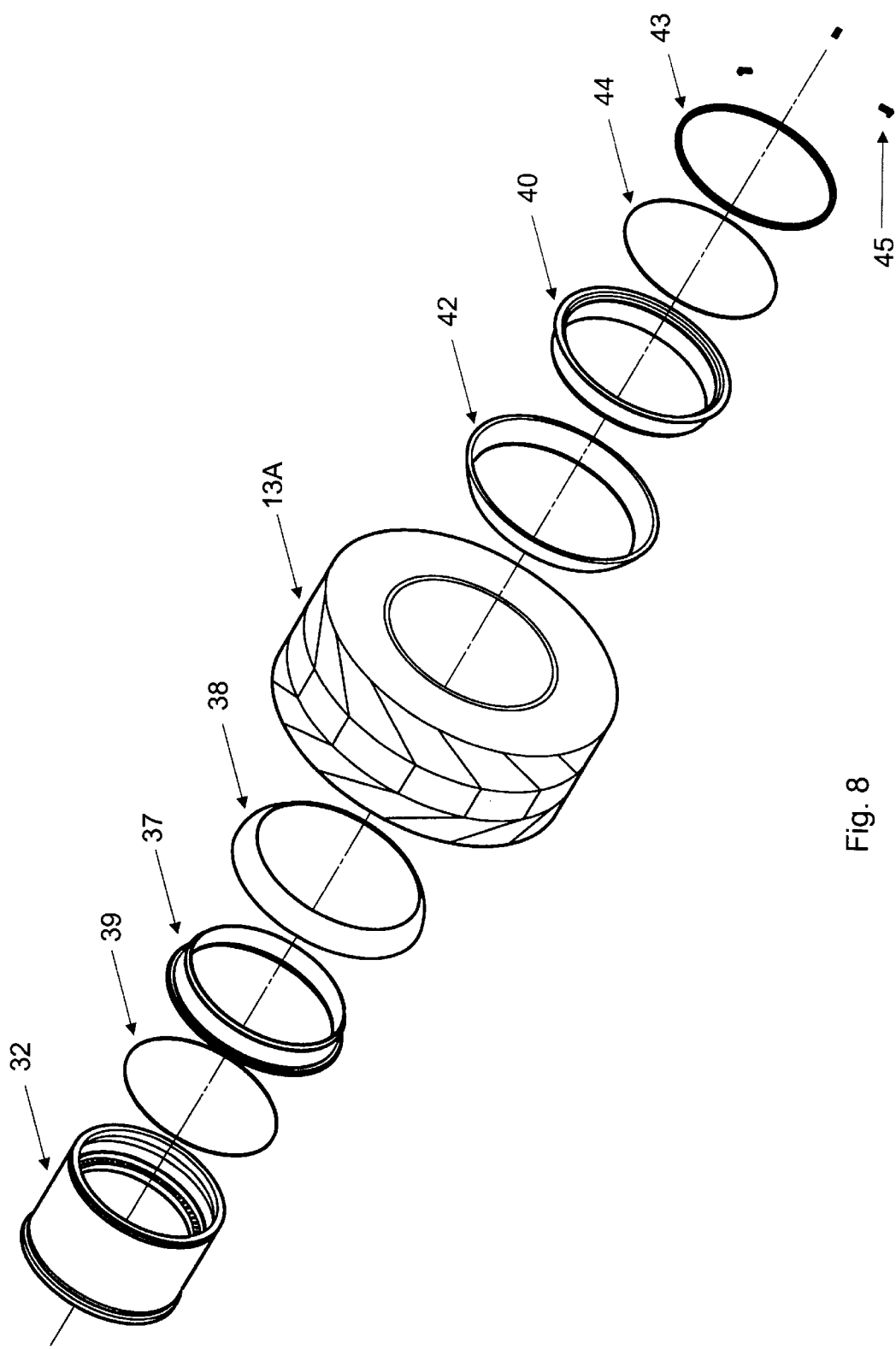
FIG. 8 is an exploded perspective view of the outer wheel of the assembly of FIG. 2.

The fitting of the tire 13A to the wheel rim 32 will now be described with reference to the assembly drawing of FIG. 8. The O-ring 39 is first seated in its groove at the inner end of the rim 32, and the bead seat 37 is then inserted over the rim 32 to abut against the flange 36 at its inner end. The tire flange 38 is then fitted around the bead seat 37. (In practice, if the tire is being re-fitted, the flange 38 may already be held on the tire from its previous fitting). The tire 13A is then placed around the rim 32, with its inner bead sitting on the bead seat 37.

If the outer tire flange 42 is not already held on the tire 13A it is fitted to the bead on the outer side of the tire. The bead seat 40 is then placed on the rim 32 and pushed inwardly to expose the O-ring groove and thereby permit the O-ring 44 to be seated in that groove. The bead seat can then be pulled outwardly over the O-ring. Finally, the split lock ring 43 is mounted on the outer end of the rim 32, and lock ring retainers 45 are bolted in place to secure the lock ring.

When the tire 13A is inflated, it expands sideways, causing the tire beads and the tire flanges to move axially outwardly and sit on the respective bead seats in a tight fit. (This expansion also causes the bead seats 37, 40 to move outwardly to abut (indirectly) against the end flange 36 and locking ring 43, respectively).

To remove the tire, the above procedure is reversed. It will be noted that the tire 13A can be removed from the rim 32, without removing the rim from the hub 11.

To remove the inner tire 13, the outer tire 13A is first removed as described above, leaving the outer wheel rim 32 mounted to the hub 11. The locking ring 23 and removable bead seat 20 of the inner wheel are removed after the inner tire has been deflated. Since the outer wheel rim is of reduced diameter relative to the inner wheel, the inner tire 13 can be removed from the vehicle by passing it over and around the outer wheel rim 32. That is, the maximum outer diameter of the wheel rim 32 is less than the inside diameter of the beads of tire 13.

The inner tire can be re-fitted by reversing the above procedure. In one application of the invention, the inner wheel rim has a standard 57 inch (145 cm) diameter, while the outer wheel rim 32 has a smaller diameter of 53 inch (135 mm).

The wheel 30 of FIG. 4 has several advantages over the prior art, including

- The tire 13A may be fitted without removal of the wheel rim 32 from the hub
- The inner tire 13 can be removed over the outside wheel rim 32, thereby avoiding the need to remove the outside wheel rim 32 from the hub 11.
- The wheel rims can remain bolted on the vehicle for the duration of their scheduled testing period, making it easier to track accumulated hours.
- Tire rotation is facilitated.
- Tire matching is facilitated.
- Knave damage caused by wheel nuts not being re-torqued properly is reduced.
- The number of spare wheel rims required on site is reduced as only tires will be removed and re-fitted to rear positions.
- The need for servicemen to use impact guns is greatly reduced.
- Tire lifting/handling apparatus of reduced capacity can be used, as it is only necessary to lift the tires and not the whole wheels.

The foregoing describes only one embodiment of the invention, and modifications which are obvious to those skilled in the art may be made thereto without departing from the scope of the invention as defined in the following claims.

For example, although the smaller-diameter wheel rim is normally used with a standard wheel rim in a dual wheel assembly, two smaller-diameter wheel rims may be used in a dual wheel assembly with the thicker bead seats to accommodate standard size tires.

Further, although the invention has been described with particular reference to a dual wheel assembly, it may also be incorporated into an assembly having more than two wheels. The term "dual wheel assembly" should therefore be interpreted, where the context permits, to cover not only an assembly of only two wheels, but also two wheels as part of an assembly of three or more wheels.

The term "comprising" as used herein, where the context permits, is to be interpreted in the inclusive sense to include the recited integers without necessarily excluding others.

What is claimed is:

1. A dual wheel assembly for a vehicle, including
   an inner wheel having an inner wheel rim and an inner tire mounted thereon,
   an outer wheel having an outer wheel rim and an outer tire mounted thereon,
   the inner and outer wheel rims being mounted coaxially on the vehicle, and the inner and the outer tires being substantially of the same size,
   wherein the outer wheel rim is of smaller diameter than the inner wheel rim such that the inner tire may pass around the outer wheel rim to enable it to be removed from the vehicle without removing the outer wheel rim.

2. A dual wheel assembly as claimed in claim 1, further including at least one removable annular bead seat member located between the wheel rim and the tire of each wheel, the bead seat member(s) on the outer wheel having a greater radial thickness than the bead seat member(s) on the inner wheel.

3. A dual wheel assembly as claimed in claim 2 wherein the outer wheel has two removable bead seat members located at respective opposite ends of the wheel rim.

4. A dual wheel assembly as claimed in claim 3 wherein the outer wheel rim has an annular flange at one end thereof against which one of the bead seat members abuts, directly or indirectly, in use.

5. A dual wheel assembly as claimed in claim 4, wherein the outer wheel rim has a locking ring thereon on the outside of the other removable bead seat member.

6. A dual wheel assembly as claimed in claim 1, wherein the outer tire has a pair of beads of predetermined inner diameter, and the outer wheel rim has an annular radial flange at an end thereof having an outer diameter which is smaller than said predetermined inner diameter.

7. A multiple wheel assembly comprising
   a first wheel having a first wheel rim and a first tire fitted thereon,
   a second wheel having a second wheel rim and a second tire fitted thereon,
   the first and second wheel rims being mounted coaxially on a hub,
   the first and second tire s being of the same size and each having inner and outer beads with a predetermnined inside diameter,
   at least one first annular spacer member mounted on the first wheel rim and forming a bead seat for a bead of the first tire,
   a pair of second annular spacer members mounted on the second wheel rim and forming bead seats for the inner and outer beads, respectively, of the second tire
   wherein the second annular spacer members have a greater radial thickness than the first annular space member(s).

8. A multiple wheel assembly as claimed in claim 7, wherein the second wheel rim has a fixed annular flange extending radially outwardly at one end thereof against which one of the annular spacer members abuts, directly or indirectly, in use, the outer diameter of the flange being less than the inside diameter of the inner and outer beads of the first tire.

9. A multiple wheel assembly as claimed in claim 8, wherein the second wheel rim has a locking ring thereon on the outside of the other annular spacer member.

* * * * *